United States Patent [19]
Clark

[11] 3,976,497
[45] Aug. 24, 1976

[54] PAINT COMPOSITIONS
[75] Inventor: Harold A. Clark, Midland, Mich.
[73] Assignee: Dow Corning Corporation, Midland, Mich.
[22] Filed: June 25, 1974
[21] Appl. No.: 483,183

[52] U.S. Cl.................. 106/287 SE; 260/37 SB; 428/344; 428/447; 428/450
[51] Int. Cl.² ................ C08G 77/16; C09D 3/82; C09K 3/00
[58] Field of Search ......... 106/287 SE; 260/29.2 M, 260/46.5 G, 37 SB; 117/132 BS

[56] References Cited
UNITED STATES PATENTS

| | | | |
|---|---|---|---|
| 2,568,384 | 9/1951 | Cheronis | 260/46.5 R |
| 2,610,167 | 9/1952 | Te Grotenhuis | 260/37 SB |
| 2,786,042 | 3/1957 | Iler | 260/46.5 R |
| 3,435,001 | 3/1969 | Merrill | 260/37 SB |

*Primary Examiner*—Theodore Morris
*Attorney, Agent, or Firm*—Norman E. Lewis

[57] ABSTRACT

Pigments are incorporated in an acidic dispersion of colloidal silica and hydroxylated silsesquioxane in an alcohol-water medium to provide paint compositions.

22 Claims, No Drawings

PAINT COMPOSITIONS

BACKGROUND OF THE INVENTION

This invention relates to a novel paint composition. In one aspect, the invention relates to a water-based paint vehicle which can be pigmented with a variety of pigments to obtain flame-resistant coatings. In another aspect, the invention relates to high gloss enamel coatings.

Various paint vehicle systems are available. Certain paint binders utilize aqueous alkali metal silicate solutions or solvent-soluble organosilicon polymers. Because of their inorganic nature the silicate-base paints are generally more flame-resistant than coatings based on organic polymers but the silicate coatings are poor in their finish characteristics; often cracking and crazing upon weathering.

The paint compositions of the present invention contain a relatively high proportion of inorganic material in the vehicle resulting in flame-resistance yet they exhibit good adhesion and weatherability because of the presence of a siloxane polymer. These paint compositions cure to provide an extremely hard high gloss finish which is stable at high temperatures.

Thus, it is an object of the present invention to provide a novel paint composition. It is another object of the present invention to provide coated substrates which exhibit improved flame resistance. It is a further object of the invention to provide a heat-resistant enameling composition. These and other objects of the present invention will be apparent to one skilled in the art upon consideration of the following description and appended claims.

DETAILED DESCRIPTION OF THE INVENTION

The paint composition of the present invention is characterized in that it comprises a pigment or blend of pigments carried in a vehicle consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said vehicle containing 10 to 50 weight percent solids consisting essentially of 10 to 70 weight percent colloidal silica and 30 to 90 weight percent of the partial condensate, said vehicle containing sufficient acid to provide a pH in the range of 3.0 to 6.0.

The paint vehicle is a solution dispersion containing from about 10 to 60 weight percent solids based on the weight of colloidal silica and partial condensate present in the vehicle. The major portion of the partial condensate is that of $CH_3Si(OH)_3$; a minor amount (30% or less) of the siloxanol being obtained from cocondensation with $C_2H_5Si(OH)_3$, $C_3H_7Si(OH)_3$, $CH_2=CHSi(OH)_3$,

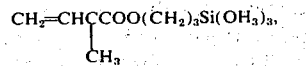

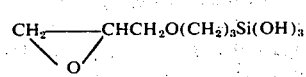

and mixtures thereof. From both the standpoint of economy and optimum properties in the cured paint, it is preferred to utilize all monomethyltrisilanol in formulating the vehicle. As described in my copending application Ser. No. 482,961, entitled "Pigment-Free Coating Compositions", filed concurrently herewith, the presence of at least 70 weight percent $CH_3SiO_{3/2}$ in the siloxane component of the vehicle provides improved hardness and abrasion resistance.

The trisilanols, $RSi(OH)_3$ are generated in situ by adding the corresponding trialkoxysilanes to an acidic aqueous medium, preferably an acidic aqueous dispersion of colloidal silica. Exemplary trialkoxysilanes are those containing methoxy, ethoxy, isopropoxy and t-butoxy substituents which upon hydrolysis liberate the corresponding alcohol; thus, generating at least a portion of the alcohol present in the paint vehicle. Upon generation of the silanol in the acidic aqueous medium, there is condensation of the hydroxyl substituents to form —Si—O—Si— bonding. The condensation takes place over a period of time and is not complete, but rather, the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three —SiOSi— units. During curing of the paint, these residual hydroxyls condense to provide a silsequioxane, $RSiO_{3/2}$.

The silica component of the composition is present as colloidal silica. Aqueous dispersions generally contain colloidal silica having a particle size in the range of 5 to 150 millimicrons in diameter. These silica hydrosols are prepared by methods well-known in the art and are commercially available under such registered trademarks as "Ludox" and "Nalcoag". It is preferred to use colloidal silica of 10–60 millimicron particle size in order to provide greater shelf life in the paint vehicle. Colloidal silicas of this type are relatively free of $Na_2O$ and other metal preferably less than 1 weight percent $Na_2O$. These silicas are available as both acidic and basic hydrosols. Colloidal silica is to be distinguished from other water dispersible forms of $SiO_2$, such as polysilicic acid or alkali metal silicate solutions, which are not operative in the practice of the present invention.

The silica is dispersed in a solution of the siloxanol in a lower aliphatic alcohol-water cosolvent. Suitable lower aliphatic alcohols are water miscible and include methanol, ethanol, isopropanol and t-butanol. Of course mixtures of such alcohols can be utilized. Isopropanol is the preferred alcohol and when mixtures of alcohol are used, it is preferred that at least 50 weight percent of isopropanol be present in such mixture. The solvent system should contain from about 20 to 75 weight percent alcohol to ensure solubility of the siloxanol. Optionally minor amounts (no more than 20 weight percent) of a water-miscible polar solvent, such as acetone, butyl cellosolve and the like, can be present in the cosolvent system.

To provide shelf life and minimize gellation in the paint vehicle, sufficient water-miscible organic acid to provide a pH of from 3.0 to 6.0 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf or bath life and require less ageing to obtain the described soluble partial condensate. It is preferred to add sufficient water-miscible carboxylic acid selected from the group consisting of acetic, formic, propionic and maleic acids to provide pH in the range of 4 to 5.5 in the coating composition. In addition to providing good bath life, the alkali metal salts of these acids are soluble, thus allowing the use of these acids with silicas containing a substantial (greater than 0.2% $Na_2O$) amount of alkali metal or metal oxide.

The vehicle is easily prepared by adding trialkoxysilanes, such as $RSi(OCH_3)_3$, to colloidal silica hydrosols and adjusting the pH to the desired level by addition of the organic acid. The acid can be added to either the silane or the hydrosol prior to mixing the two components, provided that the mixing is done rapidly. The amount of acid necessary to obtain the desired pH will vary with the alkali metal content of the silica but is usually less than one weight percent of the composition. Alcohol is generated by hydrolysis of the silicon-bonded alkoxy substituents, for example, hydrolysis of one mole of $-Si(OC_2H_5)_3$ generates three moles of ethanol. Depending upon the percent solids desired in the final vehicle composition, additional alcohol, water or a water-miscible solvent can be added. The paint vehicle should be well mixed and allowed to age for a short period of time to ensure formation of the partial condensate. The composition thus obtained is a clear or slightly hazy low viscosity dispersion which is stable for several days. The condensation of $\equiv SiOH$ continues at a very slow rate and the composition will eventually form gel structures. The bath life of the composition can be extended by maintaining the dispersion at below room temperature, for example at 40°F.

Buffered latent condensation catalysts can be added to the vehicle so that milder curing conditions can be utilized to obtain the optimum properties in the final coating. Alkali metal salts of carboxylic acids, such as potassium formate, are one class of such latent catalysts. The amine carboxylates and quaternary ammonium carboxylates are other classes of latent catalysts. Of course, the catalysts must be soluble or at least miscible in the cosolvent system. The catalysts are latent to the extent that at room temperature they do not appreciably shorten the shelf life of the vehicle composition, but upon heating the catalyst dissociates and generates a catalytic species active to promote condensation, for example an amine. Buffered catalysts are used to avoid effects on the pH of the composition. Certain of the commercially available colloidal silica dispersions contain free alkali metal which reacts with the organic acid during the adjustment of pH to generate the carboxylate catalyst in situ. This is particularly true when starting with a hydrosol having a pH of 8 or 9. The paint vehicle can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the vehicle, the shelf life is shortened and physical properties of the coating may be impaired. It is preferred to utilize from about 0.05 to 1 weight percent of the catalyst.

To provide the greatest stability in the dispersion while obtaining optimum properties in the cured paint, it is preferred to utilize a vehicle composition having a pH in the range of 4–5 which contains 25–40 weight percent solids; the silica portion having a particle size in the range of 5–60 millimicrons; the partial condensate of $CH_3Si(OH)_3$ being present in an amount in the range of 35 to 55 weight percent of the total solids in a cosolvent of methanol, isopropanol and water; the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a vehicle is relatively stable, having a shelf life of approximately one month. When pigmented and coated onto a substrate, the paint can be cured in a relatively short time at temperatures in the range of 75°–125°C.

Various pigments can be incorporated in the above-described paint vehicle. The term pigment as used herein means all types of organic and particulate inorganic coloring materials and includes fillers or extenders for pigments. Suitable pigments include alkali-earth carbonates such as chalk, magnesium carbonate, dolomite, precipitated calcium carbonate and barium carbonate, talcum, alumina hydrates, zinc oxide, magnesium oxide, fluorite, basic lead carbonate, white and colored pigments based on titanium dioxide, iron oxide red, iron oxide black, manganese black, carbons, barium yellow, strontium chromate, calcium chromate, zinc yellow, zinc green, cadmium yellow, cadmium red, cadmium vermilion, cadmopone, vermilion, ultramarine, lead chromate, chromium yellow, molybdate red, molybdate orange, chromoxide green, chromoxidehydrate green, manganese violet, manganese blue, cobalt blue, cobalt green, cobalt violet, naples yellow, and organic pigments of the azo series.

Ceramic and vitreous frits can also be used in the pigment portion of the paint composition to obtain porcelain-like coatings. Powdered metals, such as zinc dust, aluminium flakes, bronze powder and the like, form another class of pigments suitable for use in the present invention. Glass beads can be incorporated in the pigments to provide a reflective coating such as use on highway signs and pavement markings. The pigments listed above are merely illustrative of the large number of pigments available in the art. A detailed listing of both organic and inorganic pigments can be found in *The Encyclopedia of Chemistry*, Clark and Hawley, Reinhold Publishing Corp., New York (1966) beginning at page 833.

The paint compositions of the invention can contain standard additives, such as thickening agents, for example, sodium salts of acrylic and polymethacrylic acid, carboxymethylcellulose and methylcellulose; mildewcides, antifoam agents, corrosion inhibitors and the like.

The amount of pigment in the paint composition can vary widely such as from 1 to 200 parts by weight pigment per 100 parts be weight of the described vehicle. Most applications for metal require from 20 to 150 parts pigment per 100 parts vehicle. The pigments can be mixed on a ball mill or other paint mixing devices.

Once the pigment has been incorporated in the paint vehicle, the composition has a relatively short shelf life. For optimum coating properties, the paint composition should be used within 24 hours of incorporation of the pigment. The paints can be applied using conventional techniques, such as flow coating, dip coating, roller coating, spraying or brushing. The coatings can be applied to a variety of solid substrates, for example, metal, glass, ceramic materials, wood, plastics, asphalt, concrete, and the like. Application of the paint composition to flammable substrates such as wood and foamed plastics, for example foamed polystyrene, is of special interest. If desired, the substrate can be pretreated or primed with conventional paint primers to improve adhesion. The thickness of the paint film is a function of the solids content, viscosity of the composition and the method of application. Generally a paint film of 1 to 25 or 30 mils thickness is obtained by application of the paint compositions of the invention. The pigmented coatings will air dry to a tack-free condition in one to two hours and to a usable hardness in about 24 hours. Further curing and complete condensation of the siloxanol component of the paint vehicle is obtained by heating the coatings at a temperature of from 75° to 125°C. The cured coating comprises pigment uniformly incorporated in a binder matrix of colloidal silica ($SiO_2$) and $RSiO_{3/2}$.

The following examples are illustrative and not intended as limiting the invention delineated in the claims.

EXAMPLE 1

A paint vehicle, containing 36 weight percent solids, half of which was $SiO_2$, the other half of which was siloxanol calculated on the basis of $CH_3SiO_{3/2}$ weight, was formulated by adding 68 grams of $CH_3Si(OCH_3)_3$ to 100 grams of an acidic aqueous dispersion of 13–14 millimicron colloidal silica containing 30% $SiO_2$. The colloidal dispersion was a commercially available material (pH of 9.8, $Na_2O$ content of 0.32%) which had been acidified by sufficient glacial acetic acid to provide a pH of 4.8. After mixing for about 1 hour, $TiO_2$ (36 grams) was incorporated in the dispersion of colloidal silica in the solution of $CH_3Si(OH)_3$ partial condensate in the methanol-water cosolvent. The pigment was incorporated by grinding in a Waring Blender until a homogeneous paint composition was obtained After one hour, the paint composition was spray coated onto 3 × 9 inch panels of phosphatized steel. Final film thickness was in the range of 1 to 2 mils. The paint coating air dried to a tack-free condition in 2 hours giving a high gloss white enamel. After aging for 24 hours the paint composition did not give a satisfactory coating on steel.

The painted panels were tested to determine checking, hardness, adhesion, color and gloss. After 24 hours at room temperature, the coating exhibited no cracking or checking, had a pencil hardness of greater than 9H, gave 100% crosscut adhesion, had a color rating of 10 (no discoloration) with a Gardner 60°C gloss (% reflectance) of 87. Abrasion of the coating with steel wool had no visible effect. The coating retained these properties, except for a slight reduction in gloss, after being heat-aged at 600°F. for 100 hours.

Since a quantitative determination could not be obtained by the pencil hardness, the air-dried paint described above was submitted to the Sward hardness test. This test is described in Gardner and Sward, *Paint Testing Manual*, 13th Ed., 1972. The coating exhibited a Sward hardness of 88 which is to be compared to a Sward hardness of 100 for plate glass. Most commercially available epoxy or silicone paints have a Sward hardness in the range of 30 to 50.

These data demonstrate that the paint compositions of the invention can be used to provide heat-resistant enamel coating having hardness approaching that of porcelain. Such a paint would be especially useful as a coating on appliances and the exterior of cookware.

EXAMPLE 2

The paint vehicle of Example 1 was pigmented by addition of 42.3 grams of mica (1000 mesh) and 21.9 grams of $TiO_2$. After thorough mixing, the paint composition was sprayed on panels of foamed polystyrene (¾inch skin board measuring 4 × 24 inches) and allowed to air dry for 24 hours. A film thickness of approximately 2–3 mils was obtained.

A second paint vehicle was formulated by adding sufficient acetic acid to an aqueous dispersion of 50—70 millimicron colloidal silica (50% solids, pH of 8.5, $Na_2O$ content of about 0.2%) to provide a pH of 4.8. Methyltrimethoxysilane (10.8 grams) was added to 24.5 grams of the acidified colloidal dispersion which was further diluted with 16 grams of water. The components of the vehicle were mixed for about one hour to provide a methanol-water solution-dispersion containing 50% solids, 20 weight percent of which was colloidal $SiO_2$, the remainder being siloxanol as weight percent $CH_3SiO_{3/2}$. This vehicle was mixed with 43.7 grams of mica (1000 mesh) and 21.9 grams $TiO_2$ to provide a second paint composition containing 49 parts pigment per 100 parts vehicle. This paint composition was also applied to panels of foamed polystyrene and cured in the manner described above.

The flammability of the coatings was determined by subjecting the painted panels to a "Two-Foot Tunnel Test" as described in *The Journal of Paint Technology*, Vol. 44, No. 575, December 1972 at p. 64. Both paints were completely nonburning and remained reasonably intact even after the coatings became red hot at the point of flame contact. During the test the polystyrene substrate melted and shrunk away from the paint. No burning occured until a hole or crack formed in the coating and gases could escape. The gases did ignite but were insufficient to provide any reproducable flame spread data.

The two paint compositions were applied to aluminum (Alodized) panels to provide a 4 mil thick coating. After curing at room temperature for 48 hours the cured paints exhibited 90–95% adhesion to aluminum as determined by the crosscut tape test.

EXAMPLE 3

Black iron oxide (Mapico Black pigment) was mixed with a paint vehicle prepared in accordance with Example 1. Sixty grams of the pigment were ball milled with 111 grams of the vehicle for about 4 hours. The composition was then thinned with a sufficient amount of a 50—50 mixture of isopropanol-water to provide a paint containing 40 weight percent of the pigment. The paint was coated onto the outer surface of ¼ inch-diameter stainless steel tubing. After air drying the coating was cured at 100°C. for 2 hours.

The painted surfaces were exposed to sunlight and water passed through the tubing was rapidly heated. This demonstrates use of the paints of the invention as high heat transfer coatings as applied to surfaces for the collection of solar energy.

EXAMPLE 4

The paint composition prepared in Example 2 containing the 13-14 millimicron colloidal silica was applied to rigid polyurethane which had been cast in the form of insulators. The paint was air dried. There was no visible effect on the coating after the insulators were used for 60 days in an environment that included elevated temperatures and chlorine vapors.

EXAMPLE 5

Acetic acid (5 lbs.) was diluted with 15 lbs. of water and was added with stirring over a 30 minute period to 180 lbs. of the 30% colloidal silica dispersion described in Example 1. This addition was carried out in an open-top 100 gallon mixing tank equipped with an explosion-proof stirrer. Methyltrimethoxysilane (150 lbs.) was added during a 30 minute period to the acidified colloidal silica. Maximum temperature was about 40°C during this addition. Hydrolysis of the methoxysilane was considered complete after an additional 30 minutes stirring. A blend of mica (−325 mesh) and TiO₂ were then mixed with the paint vehicle. A total of 100 lbs. of mica and 50 lbs. of "low-chalk" TiO₂ were added. A small amount (3 oz.) of hydroxymethylcellulose, a thickening agent, was subsequently added to the pigmented composition. At this stage of the formulation process a five gallon quantity of the paint was removed from the tank and 4.5 lbs. of zinc dust was rapidly dispersed in the remainder.

Within eight hours of formulation, the 5 gallons of zinc-free paint were sprayed onto approximately 400 sq. ft. of cement roof tile. Another 2000 sq. ft. of in-place cement roof tile were sprayed with 20 gallons of the zinc-containing paint. The hiding power and coverage of both paints were very good. After 24 hours drying, the coatings were resistant to attack by dilute aqueous hydrochloric acid. Roof tiles with a similar coating have shown no change after six months exposure in southern Florida.

EXAMPLE 6

A pigment mixture, 3.18 grams of TiO₂ and 9.53 grams of china clay, was blended with 42 grams of the paint vehicle of Example 1 by ball milling. This pigmented composition was used to coat roofing granules to provide both color and resistance to asphalt staining.

The paint was poured over 100 grams of uncoated roofing granules. After a sufficient amount to completely wet the particles had been added, the wetted particles were stirred with a spatula while blowing hot air over the surfaces to prevent agglomeration. The dried coated particles were then further cured at 100°C for 20 minutes to provide white reflective roofing granules.

An asphalt substrate was prepared by placing 15 grams of roofing asphalt on a circular metal panel of about 15 sq. inch area. After about 15 minutes in a 400°F oven the asphalt was melted evenly over the metal surface. The asphalt was allowed to cool and 18 grams of coated granules were sprinkled over the surface. For purposes of comparison, commercially available roofing granules (ceramic-coated mineral aggregate) were adhered to an asphalt substrate in the same manner. To provide an even coating of granules the panels were inverted and placed in an 80°C oven for 1 hour. After cooling the panels were returned to the 80°C oven for 4 days to determine the degree of asphalt staining. There was no visible staining of the roofing granules coated with the paint composition of the invention while there was slight staining of the commercially available granules.

Reasonable modification and variation are within the scope of the present invention which is directed to novel paint compositions and articles coated with such compositions.

That which is claimed is:

1. A paint composition comprising a pigment carried in a vehicle consisting essentially of a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said vehicle containing 10 to 60 weight percent solids consisting essentially of 10 to 70 weight percent colloidal silica and 30 to 90 weight percent of the partial condensate, said vehicle containing sufficient acid to provide a pH in the range of 3.0 to 6.0.

2. A paint composition in accordance with claim 1 wherein the acid is a water-miscible organic acid selected from the group consisting of acetic acid, formic acid, propanoic acid and maleic acid.

3. A paint composition in accordance with claim 2 wherein the organic acid is acetic acid.

4. A paint composition in accordance with claim 2 in which the alcohol in the alcohol-water cosolvent is present in an amount in the range of 20 to 75 weight percent based on the total weight of the cosolvent.

5. A paint composition in accordance with claim 4 in which at least 50 weight percent of the alcohol is isopropanol.

6. A paint composition in accordance with claim 2 including from 0.05 to 1.5 weight percent, based on the weight of the vehicle, of a buffered latent silanol condensation catalyst.

7. A paint composition in accordance with claim 6 wherein the catalyst is an alkali metal salt of a carboxylic acid.

8. A paint composition in accordance with claim 7 wherein the catalyst is sodium acetate.

9. A paint composition in accordance with claim 6 wherein the catalyst is a quaternary ammonium salt of a carboxylic acid.

10. A paint composition in accordance with claim 1 wherein the vehicle contains 25 to 40 weight percent solids, the colloidal silica is of a 50 to 60 millimicron-diameter particle size, the partial condensate of $CH_3Si(OH_3)_3$ being present in an amount in the range of 35 to 55 weight percent of the total solids in a cosolvent of methanol, isopropanol and water; said alcohols being present in amount in the range of 30 to 60 weight percent of the cosolvent.

11. A paint composition in accordance with claim 1 wherein the pigment is present in an amount in the range of from 1 to 200 parts by weight per 100 parts of said vehicle.

12. A point composition in accordance with claim 11 wherein the pigment is present in an amount in the range of 20 to 150 parts by weight per 100 parts of said vehicle.

13. A paint composition in accordance with claim 12 wherein the pigment is a solid inorganic particulate material.

14. A paint composition in accordance with claim 13 wherein the pigment comprises titanium dioxide.

15. A paint composition in accordance with claim 14 wherein the pigment comprises a mixture of titanium dioxide and mica.

16. A solid substrate having at least one surface coated with the paint composition of claim 1.

17. An article in accordance with claim 16 wherein the paint composition has been cured to form a binder matrix of $RSiO_{3/2}$ and colloidal silica.

18. An article in accordance with claim 17 wherein the silsesquioxane portion of the binder is $CH_3SiO_{3/2}$.

19. An article in accordance with claim 18 wherein the $CH_3SiO_{3/2}$ comprises 35 to 55 weight percent of the binder.

20. An article in accordance with claim 17 wherein the pigment comprises $TiO_2$.

21. An article in accordance with claim 17 wherein the substrate is metal.

22. An article in accordance with claim 17 wherein the solid substrate is mineral aggregate.

* * * * *